Oct. 8, 1940.     G. H. SCHEFFLER     2,216,756
ACTIVATED CARBON AND PROCESS OF MAKING THE SAME
Filed Aug. 11, 1938
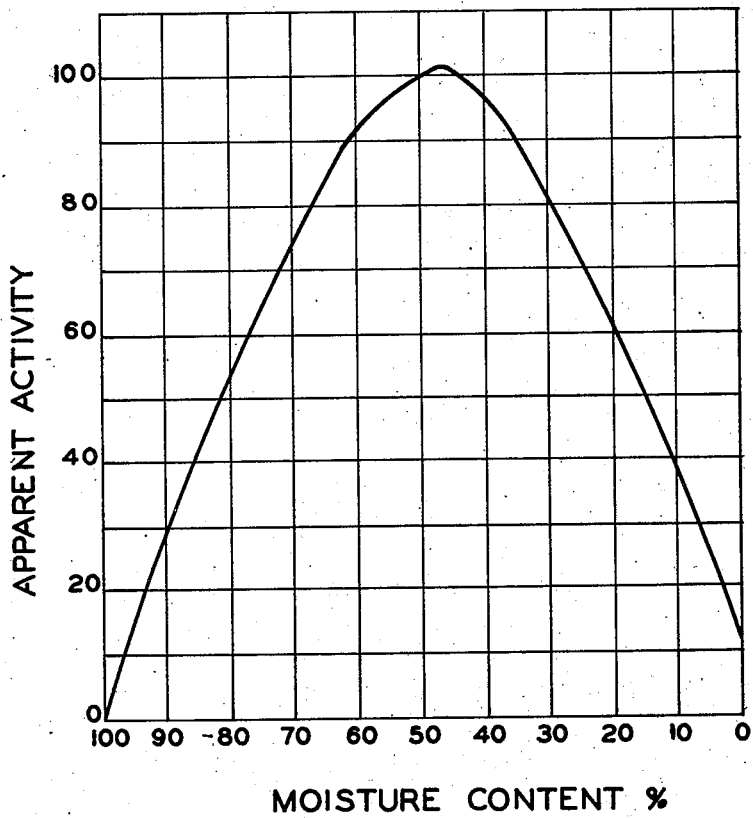
GEORGE H. SCHEFFLER.
INVENTOR
BY
ATTORNEY Patented Oct. 8, 1940

2,216,756

UNITED STATES PATENT OFFICE 2,216,756

ACTIVATED CARBON AND PROCESS OF MAKING THE SAME

George H. Scheffler, Wilmington, Del., assignor to Darco Corporation, Wilmington, Del., a corporation of Delaware Application August 11, 1938, Serial No. 224,265

6 Claims. (Cl. 252—3)

This invention relates to the production of activated carbon and more particularly to its production from wood or woody material by a process which involves the use of phosphoric acid.

The principal object of the invention is the production of activated carbon from wood by the use of phosphoric acid.

A further object is to accomplish the foregoing without objectionable loss of phosphoric acid by vaporization and destruction during the activation and with reduced corrosive attack upon the activating equipment.

Other objects will more fully hereinafter appear.

It has heretofore been proposed to activate a mixture of comminuted wood and phosphoric acid by calcining the same at temperatures of 375° C. or higher followed by the usual steps of washing to leach out the phosphoric acid, grinding and drying to remove the water. This process has not proved commercially feasible because at the temperatures employed the phosphoric acid attacks the materials of the activating furnace to an objectionable extent. In addition, at the temperatures employed, the loss of phosphoric acid by volatilization and decomposition is excessive.

I have attempted to activate wood with phosphoric acid by calcination of the mixture at lower temperatures, in order to avoid undue loss of phosphoric acid and undue corrosive effect of phosphoric acid, followed by the usual washing, grinding and drying until free from moisture, but these attempts have proved unsuccessful since the carbon so produced had no or only very little decolorizing activity.

However, I have discovered that by the employment of a temperature of from 300 to 350° C. in the activation of wood with phosphoric acid followed by washing with water to remove the phosphoric acid, there is obtained a wet activated carbon product which, upon being ground and dried by the customary drying methods, shows a maximum apparent activity at a moisture content of substantially from 35 to 60%. The wet product, after filtering or centrifuging to remove excess water, usually contains from 70 to 85% of moisture and therefore its apparent activity is very low. As it is dried it does not attain a commercially satisfactory apparent activity until a moisture content of about 60% is reached and it attains a maximum apparent activity at somewhere between the limits of about 35 to 60% moisture. As drying is continued below 35% moisture, the apparent activity decreases considerably below the maximum, frequently dropping to zero or practically zero. In addition, the production of activated carbon by this process overcomes the previous difficulties with excessive loss of phosphoric acid and undue corrosion of the apparatus.

The graph portrayed in the accompanying drawing illustrates the variation in apparent activity of the product with changes in moisture content brought about by drying in the customary manner at a temperature of 95° C. The values for apparent activity are plotted as ordinates while the values for moisture content are plotted as abscissae. The carbon upon which this graph is based was made in accordance with the process of Example II below.

It is to be understood that the drawing, although indicative of the variation in apparent activity with varying water content of activated carbon produced in accordance with the process of activation described herein, is shown merely for the purpose of illustrating the invention, and is not to be taken in any way as limiting the invention since by varying the conditions of activation, results may be obtained which do not coincide with the graph of the drawing but which are similar in that a maximum apparent activity is reached at a moisture content of approximately from 35 to 60%.

As the raw material which serves as a source of carbon, I use comminuted wood or woody material, preferring to use waste wood such as sawdust on account of its low cost. Instead of sawdust I may use any form of comminuted wood such as wood shavings, excelsior, wood flour, mechanical wood pulp or the like. Or I may use such woody material as newsprint which comprises 70% or more of mechanical wood pulp, or other paper containing substantial amounts of mechanical wood pulp.

With this woody material I admix an aqueous solution of phosphoric acid ($H_3PO_4$) which is preferably in the form of a 35 to 40% solution, employing such proportions that the ratio of phosphoric acid to woody material on a dry basis is substantially from 2 to 1 up to 4 to 1. This admixture is effected in any desired manner which gives uniform and intimate distribution of the phosphoric acid through all parts of the wood. In the case of sawdust or similar comminuted woody material, this admixture may be accomplished very simply by the use of a tank equipped with an agitator yielding an aqueous suspension of wood particles and aqueous phosphoric acid. Where newsprint is used, it may be shredded and admixed with the phosphoric acid or the newsprint sheets may be simply soaked in the aqueous acid of proper concentration for several hours and then removed therefrom, allowing the excess acid to drain back into the soaking pan or tank, whereupon, the newsprint will be found to have taken up sufficient phosphoric acid to give a ratio of from 2 to 1 up to 4 to 1, depending upon the concentration of the acid and other factors.

The aqueous phosphoric acid solution employed may be of any suitable concentration, say from 10 to 50%, although it will be obvious that concentrations outside of this range may be employed, if desired. It is preferred, however, to use a fairly dilute acid solution, say 40% or lower, because better intermingling and penetration of the acid into the woody material is thereby obtained than where acid of higher concentrations is employed. If the acid is extremely dilute, excessive amounts of heat will be required in the subsequent calcination to remove the excess of water so that activation may begin.

With regard to the ratio of phosphoric acid to woody material, a ratio of 3 to 1 is preferred, especially where an extremely resinous wood is employed as the woody material, because its resinous content acts to hinder the impregnation of the acid into the interior of the woody particles, although ratios as low as 2 to 1 give excellent results. In the case of newsprint or wood pulp the wood of which has been mechanically ground, the effect of this resinous content is less pronounced and the preferred ratio is not quite as high as in the case of a very resinous wood.

The use of ratios of phosphoric acid to dry woody material greater than 4 to 1 will in general be found to be uneconomical since the activity of the product will not be greater and the loss of acid and the corrosive action upon the apparatus will be greater. Consequently, the ratios used will be substantially between 2 to 1 and 4 to 1.

The intimate mixture of woody material and phosphoric acid is now placed in a suitable carbonizing furnace and is brought to a temperature of approximately 300 to 350° C. The time required to bring the mass to this temperature will obviously depend upon the heating equipment which is available. The mass is held at this temperature range for a period of time ranging from zero up to approximately 30 minutes. Longer periods of time do not appreciably increase the activity of the product. As the mass is heated the water evaporates and the concentration of the phosphoric acid increases to 65 to 90%, the concentrated acid thus formed acting upon the wood and resinous matter contained therein to dehydrate the same, forming a very active carbon.

The mass may then be removed from the activating furnace and cooled as by quenching in a large volume of water. The carbon is then given several washings with water to remove the phosphoric acid therefrom. After grinding and filtering a carbon is obtained having a moisture content of 70 to 85%. The activity of the carbon content of the product is excellent but its apparent activity is low. Drying the mass by usual means to low or to zero moisture content reduces the activity of the carbon to an objectionable degree, in many cases lowering the apparent activity of the product to practically zero. I have discovered, however, that when the mass is dried by usual means to a moisture content of substantially from 35 to 60% that a maximum apparent activity is attained. In addition, the cost of shipping of the excess water is eliminated.

The drying of the carbon to the specified water content is preferably accomplished by means of an elevated temperature. One very satisfactory method of drying is by passing a water slurry of the wet carbon into the trough of an atmospheric drum drier which is internally heated by steam, the surface of the drum being at about 95° C. Other methods of drying may be employed such as drying at a temperature of 140° C. Or the mass may be kept at room temperature and dry air at room or elevated temperature passed thereover until the desired moisture content is reached.

A marked advantage of the process as outlined above is that the temperatures employed are such that loss by volatilization and destruction of phosphoric acid is maintained at a very low level, not exceeding 5%. This loss is not directly proportioned to the increase in temperature but accelerates very rapidly as the temperature is raised above 350° C., and therefore the process described results in an unexpectedly lowered loss of phosphoric acid. Another advantage is that the temperatures employed are so low that corrosion of the furnace is materially reduced. Still another advantage is the high yield of carbon which commonly runs as high as 40 to 50% of the weight of woody material taken. Yet another advantage is that the product has a maximum apparent activity while its moisture content is only from about 35 to about 60%, whereas carbons produced by the same process but using lower temperatures cannot be dried to this or any moisture content without a loss in actual activity directly proportional to the extent of removal of water.

Examples of several methods of carrying the invention into practice are given below.

*Example I*

4 mesh pine sawdust and 40% aqueous phosphoric acid were stirred together, the proportion of phosphoric acid solution being such as to yield a ratio of 2 parts of $H_3PO_4$ to 1 part of dry sawdust. The mixture was then heated in a furnace to a temperature of 350° C. in three hours and 10 minutes, and immediately upon attaining this temperature the mixture was quenched in a large volume of water. After washing to remove phosphoric acid, grinding and filtering, the damp mass on the filter press showed a moisture content of 77.9%. The apparent relative efficiency of the mass was 66.3. The mass was dried at 95° C. to a moisture content of 48.5%. The product then shown an apparent relative efficiency of 139.

*Example II*

4 mesh pine sawdust and 40% aqueous phosphoric acid were stirred together, the proportions being such as to yield a ratio of 2 parts $H_3PO_4$ to 1 part of dry sawdust. The mixture was heated to 300° C. in three hours and 20 minutes and was removed immediately upon reaching this temperature and was quenched in water, washed with water in the usual manner to remove the phosphoric acid therefrom, ground and filtered. The wet mass showed a moisture content of 78.9%. The apparent activity of the mass was 57. The mass was dried at 95° C. to a moisture content of 46.3% whereupon a carbon product was obtained which had an apparent relative efficiency of 101.6.

*Example III*

4 mesh pine sawdust and 40% aqueous phosphoric acid were admixed in such proportions that the ratio of H₃PO₄ to dry sawdust was 2 to 1. The resulting mixture was placed in an activating furnace and raised to a temperature of 325° C. which required three hours and 20 minutes. Upon reaching this temperature the mass was immediately removed and was quenched in water as before, followed by washing of the carbon with water until it was substantially free from residual phosphoric acid, grinding and filtering. The mass thus obtained had a moisture content of 78.6% and its apparent relative efficiency was 62. The mass was dried at 95° C. to a moisture content of 49.6%. The product thus obtained had an apparent relative efficiency of 125.5.

Example IV 10 mesh pine sawdust was admixed with 35% aqueous phosphoric acid in such proportions that the ratio of H₃PO₄ to dry sawdust was 4 to 1. The mixture was placed in a furnace and was heated to a temperature of from 325 to 350° C. which required 3 hours and 9 minutes. The hot mass was removed immediately upon reaching this temperature range and was quenched in a large volume of water. After washing with water and filtering, a product was obtained which contained 80.6% moisture and which had an apparent relative efficiency of 75.6. The mass was dried at 95° C. to a moisture content of 40.0%. The apparent relative efficiency was now 195.

The foregoing examples are not intended to be limiting but are merely illustrative of methods of carrying the invention into practice, and the invention is to be limited only as set forth in the appended claims.

In this specification, by "apparent activity" is meant the activity of the product on an "as is" basis, and this is equal to the actual relative efficiency of the carbon content multiplied by the percentage of carbon in the product. The percentage of carbon in the product is taken as 100 minus the percentage of water in the product. The activity is measured as the molasses decolorizing efficiency of the carbon at 90% decolorization and its determination is set forth in detail in my copending application Serial No. 115,103, filed December 10, 1936, and also in the patent to V. A. McCullough, No. 2,146,024.

In the claims, by "finely divided wood" I intend to include sawdust, mechanical wood pulp, sheeted wood pulp such as newsprint, which contains large amounts of finely ground wood in the form of mechanical wood pulp, as well as any other form of subdivided woody material.

Having described my invention, what I claim is:

1. The process of preparing activated carbon which comprises heating a mixture of finely divided wood and phosphoric acid to a temperature of at least approximately 300° C. and not over approximately 350° C., cooling the hot mass, washing with water until the carbon is substantially free from phosphoric acid, and drying the washed carbon to a moisture content of substantially from 35 to 60%.

2. The process of preparing activated carbon which comprises heating a mixture of finely divided wood and phosphoric acid to a temperature of at least approximately 300° C. and not over approximately 350° C., cooling the hot mass, washing with water until the carbon is substantially free from phosphoric acid, and drying the washed carbon at an elevated temperature of at least 95° C. to a moisture content of substantially from 35 to 60%.

3. The process of preparing activated carbon which comprises commingling finely divided wood and an aqueous solution of phosphoric acid in such proportions that the ratio of H₃PO₄ to dry wood is substantially from 2 to 1 up to 4 to 1, heating the mixture to a temperature of at least approximately 300° C. and not over approximately 350° C., cooling the hot mass, washing with water until the carbon is substantially free from phosphoric acid, and drying the washed carbon to a moisture content of substantially from 35 to 60%.

4. The process of preparing activated carbon which comprises commingling sawdust and an aqueous solution of phosphoric acid in such proportions that the ratio of H₃PO₄ to dry sawdust is substantially from 2 to 1 up to 4 to 1, heating the mixture to a temperature of at least approximately 300° C. and not over approximately 350° C., cooling the hot mass, washing with water until the carbon is substantially free from phosphoric acid, and drying the washed carbon to a moisture content of substantially from 35 to 60%.

5. The process of preparing activated carbon which comprises soaking newsprint in an aqueous solution of phosphoric acid, removing the soaked newsprint from said solution after it has taken up such a quantity of phosphoric acid that the ratio of H₃PO₄ to dry newsprint is substantially from 2 to 1 up to 4 to 1, heating the soaked newsprint to a temperature of at least approximately 300° C. and not over approximately 350° C., cooling the hot mass, washing with water until the carbon is substantially free from phosphoric acid, and drying the washed carbon to a moisture content of substantially from 35 to 60%.

6. Activated carbon produced in accordance with the process of claim 1, having a moisture content of substantially from 35 to 60% consisting of the remaining portion of the washing water and said carbon being characterized by the fact that when dried at temperatures substantially above room temperature to below 35% moisture content the activity drops off sharply and approaches zero when the product is completely dried.

GEORGE H. SCHEFFLER.